United States Patent [19]

Horvath

[11] Patent Number: 4,893,648
[45] Date of Patent: Jan. 16, 1990

[54] CONTROL VALVE

[75] Inventor: Eduard Horvath, Vienna, Austria

[73] Assignee: Otto Bock Orthopadische Industrie Besitz - und Verwaltungs - KG, Duderstadt, Fed. Rep. of Germany

[21] Appl. No.: 252,859

[22] Filed: Sep. 30, 1988

[30] Foreign Application Priority Data

Oct. 2, 1987 [AT] Austria ................... 2511/87

[51] Int. Cl.[4] ............................... G05D 7/01
[52] U.S. Cl. ........................ 137/504; 138/46
[58] Field of Search ........... 137/504; 138/46

[56] References Cited

U.S. PATENT DOCUMENTS

| | | |
|---|---|---|
| 3,452,928 | 7/1969 | Stark . |
| 3,998,427 | 12/1976 | Bentley ............... 138/46 X |
| 4,023,595 | 5/1977 | Zakay ................ 138/46 X |
| 4,092,999 | 6/1978 | Rubrich ............... 137/504 |
| 4,364,410 | 12/1982 | Chow . |
| 4,428,397 | 1/1984 | Bron .................. 137/504 |
| 4,697,616 | 10/1987 | Ashcroft . |

FOREIGN PATENT DOCUMENTS 1371899 10/1974 United Kingdom .

Primary Examiner—Robert G. Nilson
Attorney, Agent, or Firm—Herbert Dubno

[57] ABSTRACT

A control valve for controlling the flow of a liquid, especially liquid of a hydraulic damping unit with a hydraulic piston-and-cylinder arrangement, has a pressure chamber defined by lamellae extending along generatrices of a cylindrical housing wall and an end wall juxtaposed with this cylindrical wall. Since the lamellae are flexible, when there is a pressure increase in the chamber, the lamellae are deflected outwardly to reduce the free cross section of the throttle gap.

14 Claims, 1 Drawing Sheet

CONTROL VALVE

FIELD OF THE INVENTION

My present invention relates to a control valve and, more specifically to a control valve for the control of the pressure of a liquid flow, especially a liquid flow to a hydraulic piston-and-cylinder damper.

BACKGROUND OF THE INVENTION

It is known to provide a control valve to control the throughflow of a liquid, for example, in a hydraulic damping unit which can have a hydraulic damping unit which can have a hydraulic piston-and-cylinder arrangement, whereby between an inlet and an outlet, a throttle element is provided.

In the conventional device of this type, a pipe or tube is provided in which a flow body is received and upon which a pressurizable bellows is provided to control the throughflow by varying the flow cross section. An automatic control of the throughflow as a function of the internal pressure is not, however, possible with this arrangement since the bellows responds to externally applied pressure.

OBJECTS OF THE INVENTION

It is the principal object of the present invention to provide a control valve for the purposes described which occupies a minimum of space, e.g. so that it can be incorporated in a prosthetic device, and can be effectively coupled to a hydraulic damping arrangement so that the damping effectiveness is increased with the pressure of the liquid flow to be controlled.

Another object of this invention is to provide a control valve which is pressure-responsive and, particularly responds to the internal or liquid flow pressure to regulate a liquid flow, especially for a hydraulic damper, whereby drawbacks of earlier systems are avoided.

Still another object of the invention is to provide an especially simple and reliable flow-control valve which is pressure responsive and does not have parts which will suffer undue wear.

SUMMARY OF THE INVENTION

These objects and others which will become apparent hereinafter are attained, in accordance with the present invention by providing a control valve in which a pressurizable chamber is provided with which a liquid flow inlet communicates and which is defined at least in part by a portion of a cylindrical wall, preferably constituting part of the periphery of a housing of right circular cylindrical cross section. The chamber is further defined by two flexible lamellae or lamellar-like walls which extend generally parallel to one another and to the cylindrical-wall generatrices and reach toward the latter.

The chamber is further defined by two end walls of which the end wall proximal to the outlet from the housing and the lamellar-like walls define a gap constituting a throttle for the flow from the inlet to the outlet. The outlet can communicate with a hydraulic damper of the piston-and-cylinder type and preferably a hydraulic damper in an orthopedic appliance or prosthesis.

Thus, under normal damping conditions, the gap between one of the end walls and the cylindrical wall and between the lamellae and the cylindrical wall surfaces form a throttle providing a normal damping effect.

When, however, there is an increase in the pressure within the chamber above a normal pressure level, the flexible lamellae deform in the direction of the cylindrical wall surface to reduce the gap width between the lamellae and this cylindrical surface so that in spite of the higher pressure substantially the same throttle flow of liquid traverses the throttle gap to allow the damper movement. The damping effect in the case of an increased pressure, i.e. when an increased damping effect is required, is thereby enhanced.

Advantageously, the chamber is formed in a valve body which is received in a cylindrical housing and it has been found to be advantageous, further, to provide an undercut beneath the chamber bottom and preferably parallel to the latter so that in the region of this last-mentioned end wall, the portion of the valve body provided with the chamber can deflect away from and toward the cylindrical wall. When unusually high pressures develop in the chamber, therefore, such bending can occur in a direction tending to increase the gap width so that such extraordinary pressures will not cause damage to the parts of the chamber in which the pressure is developed.

According to a feature of the invention, the deflectable portion of the valve body provided with the chamber can be supported or braced in the region of the freely bending end of the undercut and means can be provided to limit the mobility of this portion.

When the chamber is supported at both ends, a bending which results from a pressure in the chamber above a predetermined level can be defined to a central region of the chamber portion of the valve body. The bending away from the cylindrical wall resulting from this pressure thus only varies the gap between the lamellae edges and the cylindrical inner wall.

To control the throttle effect of the control valve during normal operation, the support means bracing the freely movable end of the chamber portion of the valve body in the direction transverse to the axis can be used.

To allow a number of damping processes to be controlled in the single valve unit or for damping of a plurality of liquid flows, the valve body can be provided with a multiplicity of identically formed chambers in angularly equispaced relationship about the axis of the device.

Further, each of these chambers can be provided with an undercut inwardly of the chamber bottom and each chamber can have an adjustable support for the end wall defining the throttle gap and the portion of the valve body provided with that chamber.

In this manner it is possible to control the damping effects of individual liquid streams as to their specific requirements.

More specifically a control valve for the control of the liquid flow, especially to a hydraulic piston-and-cylinder damper can comprise:

an elongated housing having an axis, formed with a generally cylindrical wall over at least a portion of the periphery thereof and provided with an outlet at one end of the housing;

means in the housing formed with a pair of substantially parallel flexible lamellar-like walls extending parallel to generatrices of the cylindrical wall and reaching toward the cylindrical wall, a first end wall proximal to the end of the housing, and another end wall remote from the end of the housing, the lamellar-like walls and the end walls defining a trough-shaped pressure chamber in the member opening toward the cylindrical wall with the lamellar-like walls and the first end wall defining a throttle gap between the pressure chamber and the outlet decreasing in flow cross section as fluid pressure in the chamber increases as a result of outward deflection of the lamellar-like walls; and means for feeding the liquid flow to the chamber.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figures 1, 2:
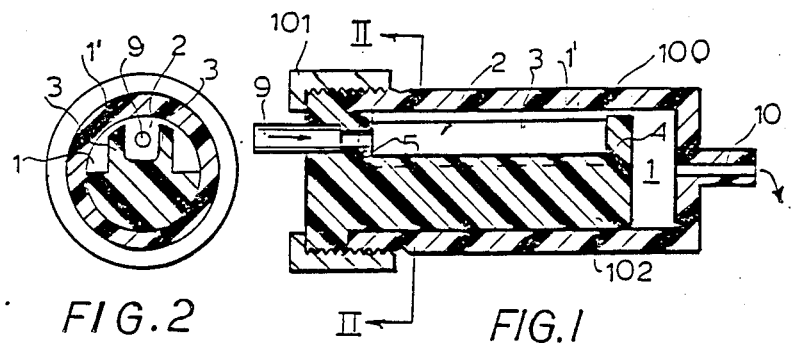
FIG. 1 is an axial cross-sectional view through a simple embodiment of a control valve according to the invention.
FIG. 2 is a cross-sectional view taken along the line II—II of FIG. 1.

In FIG. 1 a housing 100 onto which a cap 101 is threaded, has a cylindrical configuration and a cylindrical wall surface 1' which forms part of a chamber 2 on a valve body 102 held onto the housing 100 by the cap 101.

The pressurizable chamber 2 is defined by a pair of lamellae 3 or lamellar-like walls which are flexible and extend substantially parallel to the generatrices of the cylindrical wall 1' and approach the latter to define a clearance or gap therewith.

The chamber 2 is also defined by two end walls 4 and 5, of which the first end wall 4 also defines part of the throttle gap between the interior of the chamber and a space 1 within the housing proximal to this end wall 4 in which the throttled liquid flow is collected for discharge.

The chamber 2 is supplied with the liquid flow by a liquid inlet 9 opening through this wall into the chamber. The liquid outlet 10 communicates with the compartment 1 and can be connected to a hydraulic piston-and-cylinder damper chamber, e.g. for a prosthetic device.

Consequently, the throttle gap between the inlet and the outlet is constituted by a gap between the edges of the lamellae 3 and the cylindrical wall surface 1' and the gap between this cylindrical wall surface 1' and the end wall 4.

When the liquid flow through the chamber 2 is pressurized, this flow is throttled through the gap. When the pressure exceeds a predetermined level, within the liquid force within the chamber, whose outflow is limited by throttle resistance, this deflects the lamellae 3 outwardly by reason of their flexibility so that these lamellae approach the cylindrical wall 1' more closely and the flow cross section and width of the gap between the edges of the lamellae and the cylindrical wall 1' is reduced.

The combination of the pressure increase within the chamber 2 and the reduced flow cross section through the throttle gap ensures that an approximately constant flow of liquid will traverse the valve so that there will be a corresponding damping in the hydraulic piston-and-cylinder unit connected to the valve.

Figures 3, 4:
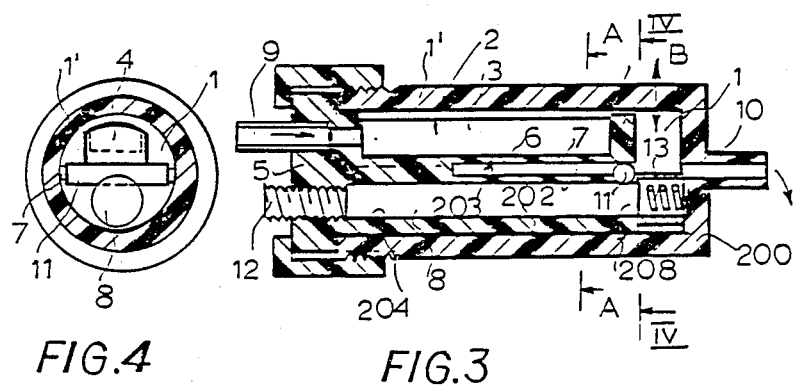
FIG. 3 is a section analogous to that of FIG. 1 through a more complex control valve.
FIG. 4 is a section taken along the line IV—IV of FIG. 3.

In the embodiment of FIGS. 3 and 4, in which corresponding parts are represented with the same reference numerals, it can be seen that an undercut 7 extending from the right-hand end inwardly can be formed in the valve body (FIG. 3), this undercut being parallel to the bottom of the chamber 2.

At the right-hand end, i.e. where the undercut opens freely, a support 11 is provided for the portion of the valve body above this undercut and containing the chamber 2. This portion of the valve body 202 is represented at 203 in FIG. 3.

The support 11 can be a roller which is braced against an adjusting pin 8 axially slidable in a bore 204 of the cylinder body 202. This adjusting pin has a frustoconical portion 208 which forms a cam engaging the roller II, the latter constituting a cam-follower roller.

The pin 8 can be axially shifted by a screw 12 threaded into the body 202 and, based upon the conicity of the portion 208, can adjust the deflectable portion 203 in a direction (arrow B) perpendicular to the axis of the device. The axial displacement of the pin 8 is effected against the force of a restoring spring 13, also received in the housing 200.

In normal operation, the valve of FIGS. 3 and 4 functions in the same manner as the embodiment of FIGS. 1 and 2. However, the embodiment of FIGS. 3 and 4 has the advantage that the width of the throttle gap can be so adjusted that the desired damping degree can be reached.

For example, by rotation of the screw 12, the pin 8 can be displaced to the right to decrease the throttle gap width or rotated in the opposite direction to permit the spring 13 to shift the pin 8 to the left and increase the width of the throttle gap.

Upon an increase of the pressure within chamber 2, as has already been described in connection with FIGS. 1 and 2, the lamellae 3 bend apart and reduce their spacing from the wall 1' and hence the free cross section of the throttle gap.

However, should the pressure build up beyond a predetermined level in the chamber 2, the portion 203 of the valve body provided with the chamber can bend in the region of the undercut 7 to allow the lamellae to move away from the wall 1' and relieve the excess pressure by increasing the free cross section of the gap. The latter operation occurs generally only when the buildup of pressure may be such as to endanger the control valve or elements of a hydraulic system upstream thereof.

In place of the axially displaceable pin, screw and spring 13 as separate elements, the screw can be connected directly to the pin 8 or form part thereof, eliminating the need for a spring. In place of a cone requiring axial displacement of the pin, the rotatable rod formed with an eccentric can be substituted.

Figure 5:
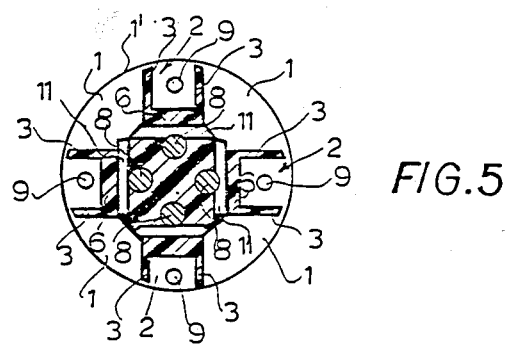
FIG. 5 illustrates yet another embodiment of the invention in a section which corresponds to a section taken along the plane A—A of FIG. 3.

FIG. 5 illustrates an embodiment of the invention in which four chambers 2 similar to those already descried are provided in a cylindrical space 1. Each of the chambers 2 can be constructed as described in connection with FIG. 3 and FIG. 5 and can be treated as if it is a cross section along the plane A - A with respect to the relationship between each chamber and the respective gap-adjusting means is concerned. In this embodiment, of course, each of the adjustment pins 8 can adjust the throttle gap for the respective chamber individually.

The control valve of the invention can be advantageously incorporated in the piston of a hydraulic piston-and-cylinder damping device because the space requirements of the control valve are relatively small.

I claim:

1. A control valve for the control of a liquid flow, especially to a hydraulic piston-and-cylinder damper, said control 3 valve comprising:

an elongated housing having an axis, formed with a generally cylindrical wall over at least a portion of the periphery thereof and provided with an outlet at one end of said housing;

means in said housing formed with a pair of substantially parallel flexible lamellar-like walls extending parallel to generatrices of said cylindrical wall and reaching toward said cylindrical wall, a first end wall proximal to said end of said housing, and another end wall remote from said end of said housing, said lamellar-like walls and said end walls defining a trough-shaped pressure chamber in said member opening toward said cylindrical wall with said lamellar-like walls and said first end wall defining a throttle gap between said pressure chamber and said outlet decreasing in flow cross section as fluid pressure in said chamber increases as a result of outward deflection of said lamellar-like walls; and means for feeding said liquid flow to said chamber.

2. The control valve defined in claim 1 wherein said housing has the configuration of a right circular cylinder.

3. The control valve defined in claim 2, further comprising an elongated valve body extending into said housing and constituting the means formed with said flexible lamellar-like walls said first end wall and said other end wall defining said trough-shaped pressure chamber.

4. The control valve defined in claim 3 wherein said body is formed inwardly of said chamber with an undercut enabling a portion of said body provided with said chamber and said first end wall to flex relative to the remainder of said body, thereby enabling variation in a width of said gap at said first end wall.

5. The control valve defined in claim 4 wherein said undercut extends generally parallel to a bottom of said chamber.

6. The control valve defined in claim 4 wherein said undercut reaches to a free end of said portion at said first end wall, said control valve comprising means in said housing for supporting said free end of said portion.

7. The control valve defined in claim 6 wherein said means for supporting said free end of said portion includes means adjustable in a direction transverse to said axis for selectively varying said width.

8. The control valve defined in claim 6 wherein said means adjustable in a direction transverse to said axis for selectively varying said width includes a roller extending transverse to said axis and braced against said free end of said portion, a rod extending in said body parallel to said axis and provided with a camming formation adjustably engaging said roller, and means operable from a location external to said housing for displacing said rod.

9. The control valve defined in claim 2, further comprising at least one elongated valve body extending into said housing and constituting the means formed with said flexible lamellar-like walls said first end wall and said other end wall defining said trough-shaped pressure chamber, said trough-shaped chamber being one of a plurality of such chambers formed in said housing and having respecting inlets for respective liquid flows and defining with the respective lamellar-like walls and first end walls respective throttle gaps communicating with said outlet.

10. The control valve defined in claim 9 wherein said body is formed inwardly of said chamber with an undercut extending generally along each of said chambers enabling a respective portion of said body provided with each chamber and the respective said first end wall to flex relative to the remainder of said body, thereby enabling variation in a width of said gaps at said first end walls.

11. The control valve defined in claim 10 wherein said undercuts each extend generally parallel to a bottom of the respective said chamber.

12. The control valve defined in claim 10 wherein said undercuts each reach to a free end of the respective said portion at the respective said first end wall, said control valve comprising means in said housing for supporting said free ends of said portions.

13. The control valve defined in claim 12 wherein said means for supporting said free ends of said portions includes respective means for each of said portions adjustable in a direction transverse to said axis for selectively varying the respective said width.

14. The control valve defined in claim 13 wherein each of said means adjustable in a direction transverse to said axis for selectively varying the respective said width includes a roller extending transverse to said axis and braced against the respective said free end of the respective portion, a respective rod extending in said body parallel to said axis and provided with a camming formation adjustably engaging the respective roller, and means operable from a location external to said housing for displacing said rods.

* * * * *